United States Patent [19]

Rose

[11] Patent Number: 5,256,043
[45] Date of Patent: Oct. 26, 1993

[54] VANE PUMP HAVING IMPROVED VANE SEALING

[75] Inventor: Heinz Rose, Blender, Fed. Rep. of Germany

[73] Assignee: Vemag Maschinenbau GmbH, Verden/Aller, Fed. Rep. of Germany

[21] Appl. No.: 859,085

[22] Filed: Mar. 27, 1992

[30] Foreign Application Priority Data

Mar. 30, 1991 [DE] Fed. Rep. of Germany ....... 4110547

[51] Int. Cl.$^5$ ............................................. F01C 21/00
[52] U.S. Cl. ...................................... 418/23; 418/108
[58] Field of Search ............... 418/260, 261, 264, 23, 418/108

[56] References Cited

U.S. PATENT DOCUMENTS

| | | | |
|---|---|---|---|
| 1,307,631 | 6/1919 | Jacques | 418/125 |
| 1,995,755 | 3/1935 | Smith | 418/260 |
| 2,153,587 | 4/1939 | Parreira | 418/127 |
| 2,604,853 | 7/1952 | Taylor | 418/26 |
| 2,619,913 | 12/1952 | Longenecker | 418/264 |
| 4,895,278 | 1/1990 | Mataro | 418/23 |
| 5,102,314 | 4/1992 | Staudenrausch | 418/15 |

FOREIGN PATENT DOCUMENTS

| | | |
|---|---|---|
| 0388625 | 9/1990 | European Pat. Off. . |
| 480149 | 7/1929 | Fed. Rep. of Germany . |
| 851902 | 4/1953 | Fed. Rep. of Germany . |
| 1064839 | 9/1959 | Fed. Rep. of Germany . |
| 1175107 | 7/1964 | Fed. Rep. of Germany . |
| 2812363 | 9/1978 | Fed. Rep. of Germany . |
| 33344181 | 6/1984 | Fed. Rep. of Germany . |
| 8914705 | 10/1990 | Fed. Rep. of Germany . |
| 2037771 | 12/1970 | France . |
| 2367205 | 5/1978 | France . |
| 89/00814 | 2/1989 | PCT Int'l Appl. . |
| 957593 | 5/1964 | United Kingdom . |
| 2158516 | 11/1985 | United Kingdom . |

OTHER PUBLICATIONS

Copy of European Search Report.

*Primary Examiner*—Richard A. Bertsch
*Assistant Examiner*—Charles Freay
*Attorney, Agent, or Firm*—Merchant & Gould, Smith, Edell, Welter & Schmidt

[57] ABSTRACT

The invention concerns a vane pump for conveying bulk substances, in particular meat pastes, having a housing (4) with an inlet (6) and an outlet (10) for the bulk substance. Disposed inside the housing (4) is a rotor (14) displaying a rotatably-journaled, central driving element (16) and several moving vanes (20a to j), which are arranged on the central driving element, in its direction of rotation (C), one behind the other and at an angle to the direction of rotation (C), and commonly surrounded by a limiting wall (24) of the housing (4) running about in the direction of movement (C) of the vanes (20a to j), with the limiting wall (24) forming conveying chambers for picking up (accommodating) bulk substances and, with rotation of the driving element (16), being moved in sequence past the inlet (6) and the outlet (10). Control means are provided for the defined approach of the vanes (20a to j) toward the limiting wall (24), up to a minimum distance, through means of which is achievable a sufficient degree of sealing without bodily (physical) contact between the vanes (20a to j) and the limiting wall.

20 Claims, 4 Drawing Sheets

VANE PUMP HAVING IMPROVED VANE SEALING

BACKGROUND OF THE INVENTION

The invention concerns a vane pump for conveying bulk substances, in particular meat paste in the form of soupy, boiled or raw sausage base, or pieces of meat or other viscous bulk substances, with a housing having an inlet and an outlet for the bulk substance, and with a rotor disposed inside the housing, which displays a rotatably-journaled, central driving element and several moving vanes, which are arranged one behind the other on the driving element in its direction of rotation, and at an angle to the direction of rotation, and that are commonly surrounded by a limiting wall of the housing running in the direction of movement of the vanes, with the limiting wall forming conveying chambers for picking up and transporting the bulk substance, and with rotation of the driving element being moved past the inlet and outlet in sequence.

Known as conveying contrivances for these types of tasks are the screw pump and the vane-cell pump. These types of pumps are generally employed for the continuous or portionwise conveying of meat paste in such manner as to join a hopper-shaped feeding arrangement with a downstream decanting arrangement. From the feeding arrangement the meat paste arrives into the pump via the inlet, which then discharges the meat paste, under pressure, from the outlet into the decanting arrangement. Conveying the meat paste under pressure into the decanting arrangement is a prerequisite for its proper functioning. In order that the bulk substance be capable of being conveyed from the inlet to the outlet, the vanes of the rotor, along with the limiting wall, form conveying chambers that pick up the bulk substance in the region of the inlet and then discharge it again in the region of the outlet. For avoiding air inclusions in the bulk substance and for easier filling, additionally provided is an arrangement for generating a negative pressure or vacuum in the conveying chambers.

A vane pump of the previously-described type is known, for example, from DE-PS (West Germany Patent) 16 53 843. There, disposed in the inner region of the rotor in non-rotatable fashion, but radially displaceable, is a cam on which are supported radially-movable vanes along with their part projecting into the rotor. The cam can be pressed outwardly with the aid of a radial slot guide and a sloping surface. In doing this, it presses in the compression region of the pump on the rear part of the vanes brushing by, which, in this region, are pressed against the limiting wall of the housing such as to bring about an improved sealing action. However, it has been shown that this type of sealing by the vanes is not optimal, because to be precise only one vane at a time can actually lay up tight against the limiting wall of the housing and/or be pressed against this latter. Additionally, an exact radial setting and readjustment of the vanes is not possible, and this known vane pump displays a complicated and expensive construction.

Therefore, proposed in DE-GM (West Germany Utility Model) 89 14 705 is an improved vane pump, where two vanes lying opposed to one another are joined together via a central strut, with a radially adjustable pressure piece being journaled in a radial cutout of the limiting wall, which replaces the contour of the limiting wall with its surface facing toward the vanes. The pressure piece presses the vanes against the oppositely-lying wall, in a region shortly ahead of the pump outlet. In this way, at least two vanes can be constructed pressure tight, and therewith a conveying chamber.

Also known are types of vane pumps where the vanes are axially displaceable, however being otherwise sealed in similar fashion by pressing against the limiting wall, like in the case of the previously described, known vane pumps.

With all customary type vane pumps, sealing is accomplished only by pressing the vanes against the limiting wall of the housing. The consequence is an undesired friction between vanes and housing and, therewith, a not inconsiderable wear of the vane pump, so that frequent maintenance of the vane pump (in particular by replacement of the stator, of the rotor or at least the vanes) is indispensable. Because of the wear, the conveying cell is no longer pressure tight. Hence, efficiency is worsened by backflow losses, and, therewith, the precision of portioning is decreased in disadvantageous fashion.

SUMMARY OF THE INVENTION

Therefore, the object of the invention, in the case of a vane pump of the initially-mentioned type, is to reduce the friction between the vanes and the housing and, therewith, reduce the wear on the pump, and by this means also to reduce the portioning imprecisions occurring with the state of the art, so that reliability can be increased.

This objective is satisfied in the case a vane pump of the initially-mentioned type by providing control means for the defined approach of the vanes to the limiting wall, up to a predetermined minimum interval, through means of which is achievable a sufficient degree of sealing without bodily contact between the vanes and the limiting wall.

Hence, the vane pump in accordance with the invention obtains its tightness not by pressing the vanes against the limiting wall of the housing, but rather by a defined rapprochement to this limiting wall up to a minimum measure, so that, for one thing, the desired degree of sealing is achieved, for another thing, however, no metallic contact is needed between the vanes and the housing, and subsequently the friction against the limiting wall is eliminated. Indeed, there does remain a small gap between the vanes and the limiting wall of the housing, however it has surprisingly been shown that this gap can be selected to be so small that the pressure tightness of the conveying chambers formed by the vanes, the rotor and the inner limiting wall can be essentially maintained by the meat pastes to be carried away. Provided that there is connected to the vane pump a device generating a negative pressure or a vacuum, it has likewise been surprisingly shown that an essential loss of the negative pressure generated in the conveying chambers of this contrivance likewise does not appear in practice.

The consequence of the frictionless sealing of the vanes against the housing is a considerable reduction of the wear and, therewith, increasing the reliability of the vane pump. The maintenance intervals, compared to the state of the art, can be considerably lengthened. Since there no longer occurs any metallic contact between the vanes and the housing, the precision of portioning can be raised essentially. Another advantage of the construction in accordance with the invention consists of the fact that one is now free to make use of stainless steels and, thereby, can also meet the high demands for hygiene.

A preferred embodiment of the invention is characterized by the fact that the control means, during rotation of the central driving element, controls the movement of the vanes such that the volume of each conveying chamber is brought to a minimum between the vanes on the way from the outlet to the inlet, and then brought to a maximum, and after leaving the inlet is again reduced on the way to the outlet.

Preferably, the degree of reducibility of the volume of the conveying chambers after leaving the inlet is adjustable.

In the case of another construction, it is possible to provide, in the direction of movement, between the outlet and the inlet, a negative-pressure connection that is connected to an arrangement for generating the negative pressure or vacuum, and past which the vanes are moved.

Therefore, in the case of this embodiment, the controlling means are laid out such that the vanes assume, at the different places, the desired position there in each case. Therefore, going out from the outlet, the conveying chambers between two vanes are first brought to a minimum. Next, the vanes are moved by the controlling means such that the volume of the conveying chambers is considerably enlarged in the region of the negative-pressure connection, whereby there occurs an empty conveying chamber to which can be applied a vacuum and/or a negative pressure. Then, in the region of the inlet, the conveying chamber, because of the difference of pressure relative to the initial pressure of a feeding arrangement connected to the inlet, is filled with bulk substance. As soon as this now-filled conveying chamber has left the inlet region with the trailing vane, its volume is again reduced somewhat, whereby the mass of the just-filled conveying chamber is compressed somewhat. The rise of pressure in the just-filled conveying chamber serves, for one thing, for the further ventilation of the conveyed bulk substance by expressing any possibly still-present free air, for which purpose can advantageously be provided auxiliary suctioning channels. The second purpose of compression consists of adapting the pressure of the bulk substance to the pressure in the region of the outlet. The more exactly the two pressures agree, the more pulsation-free will be the conveying and, therewith, the precision of portioning.

In a further development of the foregoingly-described embodiment, the volume of the conveying chambers can remain essentially constant on the way from the negative pressure connection to the inlet.

In order to bring the volume of the conveying chambers, on their way from the outlet to the inlet, to a minimum, in a constructively, particularly simple fashion, the limiting wall can display, between outlet and inlet, a projection which, observed in the direction of rotation of the rotor, produces back of the outlet an essentially sudden reduction of the interval between the limiting wall and central driving element, and toward the inlet region a gradual widening of this interval, which then remains essentially unchanged up to the connection.

In accordance with another actual, particularly preferred aspect of the invention, the vanes are each one journaled, on the central driving element, pivotably about their own axis. Therefore, movement of the vanes results by pivoting, so that the vanes are built as pivoting vanes that are rotatable about their axis of pivot in the direction of the rotary movement of the driving element, as well as opposite to this direction. Preferably, the pivoting axes of the vanes and the axis of rotation of the central driving element should run parallel to each other and, in the case of all vanes, the distance between the axis of pivot to the axis of rotation should be the same, so that the axes of the vanes are guided in the circle about the axis of rotation of the rotor.

Here, the controlling means, during rotation of the central driving element, should control the pivoting movement of the vanes such that, after leaving the outlet region, they are pivoted toward the central driving element, when approaching the inlet they are swung out corresponding to the contour of the limiting wall, and after leaving the inlet region they are pivoted somewhat forwardly in the direction of the rotor.

Probably, the free end of each vane facing toward the inner limiting wall displays, between a leading and a trailing edge, the form of a section of cylinder whose axis coincides with the pivot axis of the vane, and when leaving the inlet region formed will be the minimum interval for achieving a sufficient degree of sealing between the leading edge of the free end of the vane and the limiting wall, and pivots the vane, on the way to the outlet, in the direction of rotation of the rotor until the minimum adjoining interval between the trailing edge of the free end of the vane and the wall is produced. The measure of pivoting in the direction of rotation of the rotor after leaving the inlet region is, therefore, determined by the thickness of the free end of the vane between the leading and trailing edges. For achieving the minimum conveyed distance during this pivoting movement, the free end of each vane is constructed in the form of a section of a cylinder, with the cylinder axis coinciding with the pivot axis of the vane.

Likewise, a section of the projection adjacent to the outlet can display the contour of a section of a cylinder whose axis coincides with the axis of rotation of the rotor, with the vanes displaying on their forward side a corresponding contour, and being pivoted in the region of the projection such that, with their front side, they lie opposite this section of the projection, at a minimum distance for achieving a sufficient degree of sealing. In this fashion, after leaving the outlet region, formed will be a longer, essentially "flatter" sealing gap between the vanes and the inner limiting wall.

A further development of this embodiment is characterized by the fact that each vane is journaled, over its own shaft, to the central driving element and the control means control arms, of which one control arm is rigidly attached with its one end to a shaft of a vane, and comprising a closed, orbital control curve running about the axis of the rotor, which is formed in or on a disk-shaped element, and in which the control arm is guided with its other free end.

Corresponding to the pattern of the orbital curve, therefore, the vanes are pivoted individually in the desired manner about their pivot axes. The control curve must be laid out such that the vanes assume, at the different places, the desired position there. For this purpose, the control curve preferably displays, between the inlet and the outlet, first a minimal distance to the axis of rotation of the rotor and then an increased distance, and between inlet and outlet a maximum interval.

The measure of the pivoting movement of the vanes will, therefore, be determined by the change in the distance of the control curve from the axis of rotation of the central driving element. Here, the method of operation of the control arms is comparable to that of drag levers. With rotation of the central driving element, its movement is transferred to the vanes via the shaft. Since the control arms are rigidly attached with their one end to the vane shafts, their back ends that are guided in the control curve will perforce be carried along.

For reducing friction, preferably located at the free end of each control arm is a roller that is guided in the control curve. In another preferred, further development of the aforementioned embodiment, the disk-shaped element displaying the control curve is divided into an element that is stationary relative to the housing and into an element that is displaceable thereto, however capable of being fixed in any desired displacement position, said element displaying the section of control curve running between inlet and outlet. In the state of the art, the measure of compression was predetermined by the geometry of the pump housing and, therefore, was fixed for this housing. In this embodiment of the invention, on the other hand, provided is that the control curve be separated into a fixed part and a part displaceable relative thereto. The fixed part extends over the entire region outside of the section serving for precompression, while the adjustable part is disposed approximately in the region between inlet region and outlet. Since the measure of pivoting movement of the vanes is determined by the change of the distance of the control curve from the axis of rotation of the central driving element, it is possible, with the aid of the divided control curve, to change this distance in the region of compression. Accordingly, the pressure in the conveying chambers can be adapted exactly to the outlet pressure in correspondence to the compressibility of the bulk material.

Practically, the outlet is built in the limiting wall of the housing. The limiting wall can have the form of a cylinder whose axis coincides with the axis of rotation of the rotor.

In another practical embodiment, the vanes can be removably attached to the central driving element, with each vane preferably being mounted in rotation-fast fashion on the associated shaft. One advantage of this embodiment consists of the fact that, for cleaning purposes, only comparatively small parts, namely the vanes, need to be removed from the vane pump, and no longer the comparatively difficult stators, rotors or vane cell inserts in their totality, like in the state of the art. Another advantage is the comparatively simple possibility of adapting the vane pump in accordance with the invention to different bulk substances. On the one hand, we are dealing here with emulsions such as soupy, boiled or raw sausage meat paste, and, on the other hand, we can also be dealing with larger-size pieces of meat, for example hams, turkey breasts etc. . . . These latter can actually be fed in as larger pieces also with the state of the art, however, because of the established size of the conveying chambers, they are conveyed out from the conveying-cell pumps, up until now, mostly sheared off and comminuted. In the case of this embodiment of the invention, the size of the conveying chambers can be doubled, for example by removing each second pivoting vane, and thereby achieve simple conversion for the different bulk substances to the conveyed, without the pressure tightness having been altered. In the case of the state of the art, there was indeed also possible a removal of the vanes, however, in so doing, the guide slot for the removed vane in the driving element was opened up and, therewith, the sealing between the conveying cells and the pump housing was given up.

BRIEF DESCRIPTION OF THE DRAWINGS

Explained in more detail in the following with the aid of the accompanying figures is a preferred example of embodiment of the invention.

DETAILED DESCRIPTION OF THE PREFERRED EMBODIMENT

Figure 1:
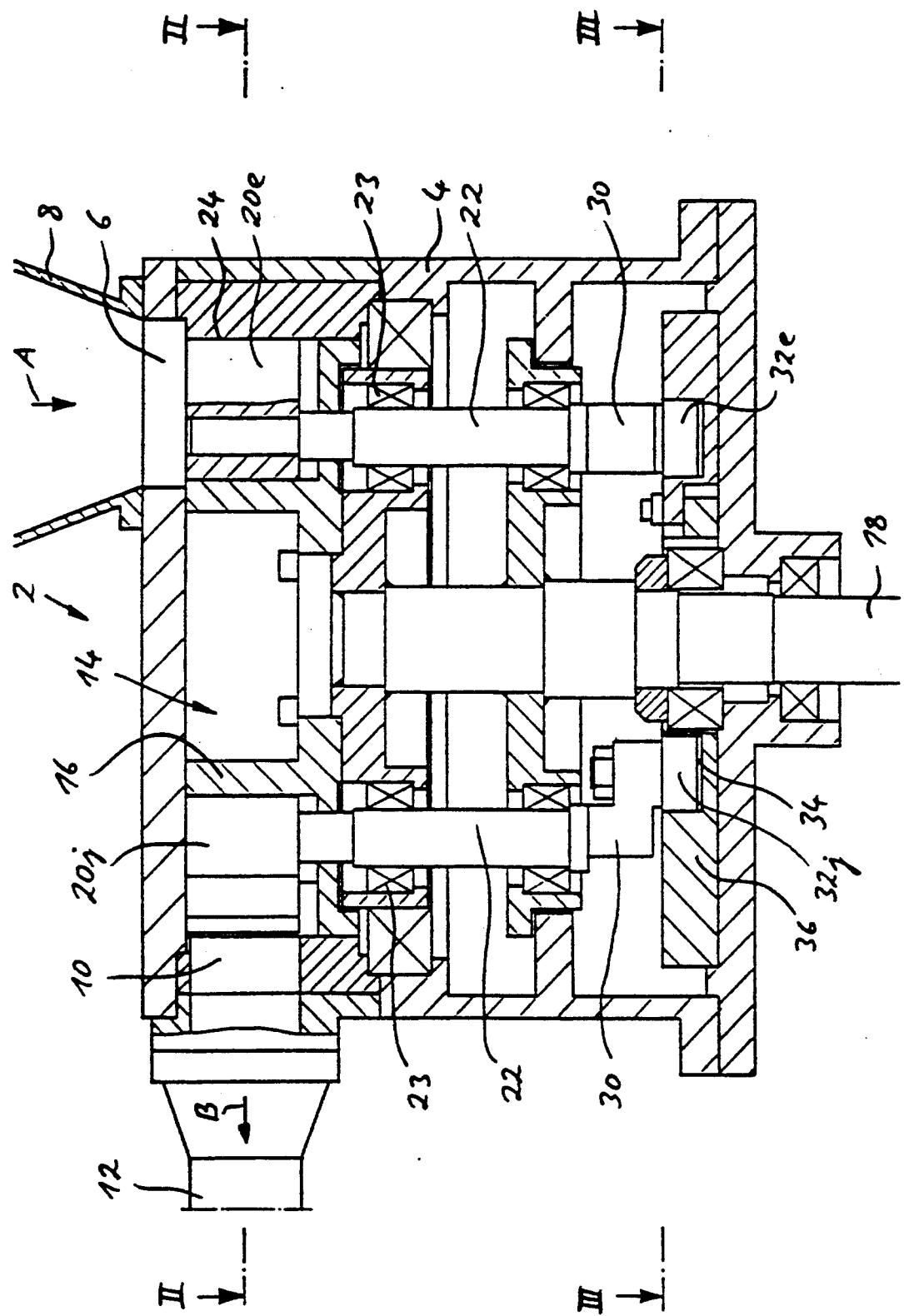
FIG. 1 shows a longitudinal cut through a vane pump.

As can be recognized in FIG. 1, the vane pump 2 represented there has a housing 4 with an inlet 6, to which is connected a hopper-shaped feeding arrangement 8, and with an outlet 10 to which is connected a decanting arrangement, as for example the represented discharge tube 12. The inlet 6 is constructed as an opening in the cover plate of the housing 4, so that the hopper-shaped feeding arrangement 8 is seated on the top side of the vane pump 2. On the other side, the outlet 10 is constructed as an opening in a side wall of the housing 4.

Disposed inside a chamber 15 constructed in the housing 4 is a rotor 14, which displays a rotatably journaled, central driving element 16 that is driven via a rotating shaft 18 from a drive that is not represented. As can be recognized in FIG. 2, the central driving element 16 is constructed essentially as a circular disk.

Figure 2:
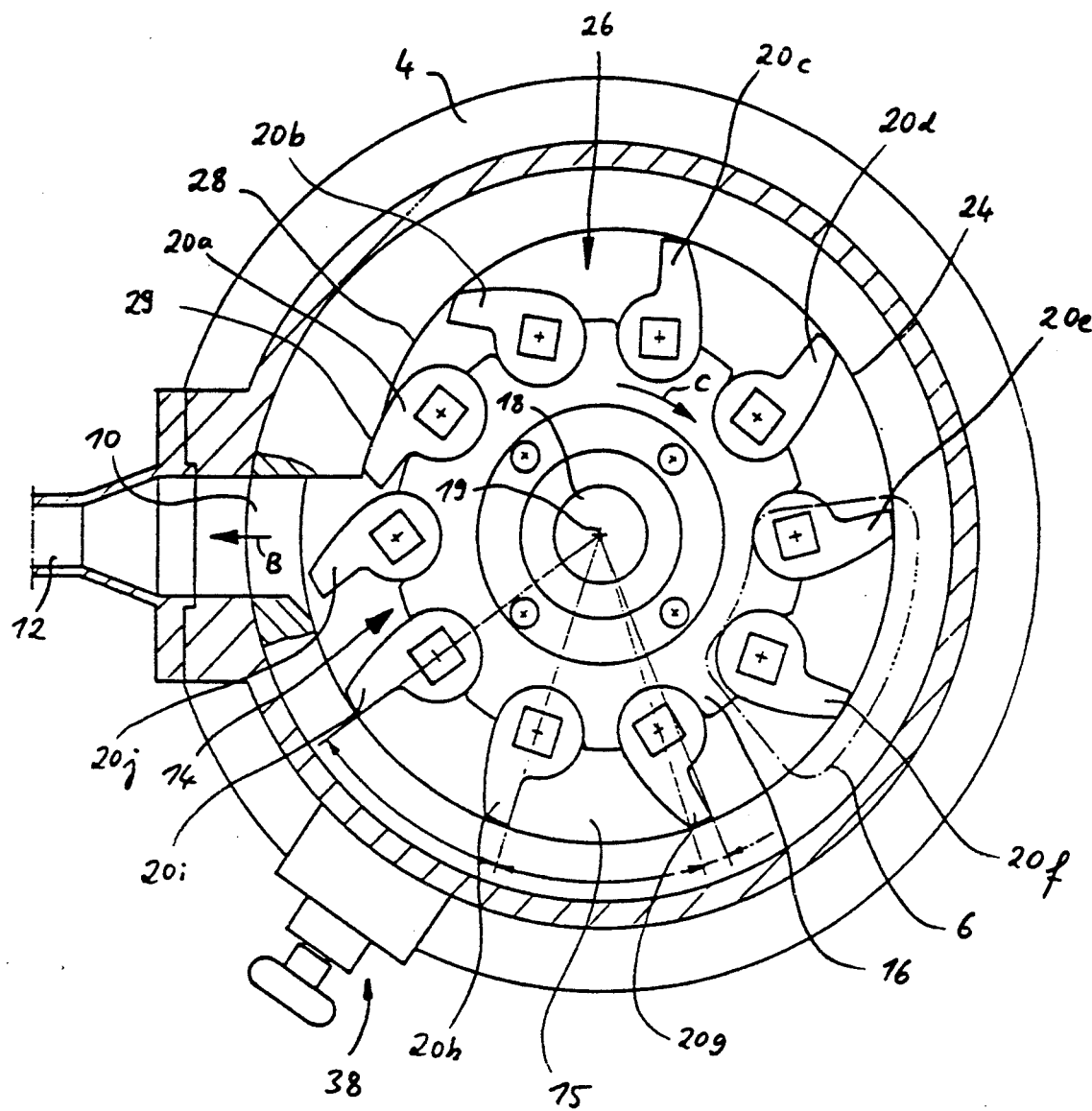
FIG. 2 shows a cross section through the vane pump, along the line II—II of FIG. 1.

As can further be seen in FIGS. 1 and 2, disposed along the periphery of the central driving element 16 are several vanes 20a to j. For this purpose, each one of the vanes 20a to j is attached in rotation-fast fashion on a shaft 22, which is rotatably journaled on the central driving element 16 by means of ball or roller bearings 23. The axes of rotation of the shafts 22 of the individual vanes 20a to j run parallel to the axis of rotation 19 of the rotating shaft 18 of the central driving element 16. The interval from the axes of rotation of the shafts 22 to the axis of rotation 19 of the central driving element 16 is the same for all vanes 20a to j, so that the axes of rotation of the shafts 22 are disposed on a circle about the axis of rotation 19. Also, the distance between the individual shafts 22 is constant.

As can be recognized from FIG. 2, the entire rotor 14 is surrounded by a inner limiting wall 24. This inner limiting wall 24 is part of the chamber 15 that is constructed inside the housing 4 and, among other things, is also limited by the top cover plate, and in which the rotor 14 is seated. The vanes 20a to j are disposed on the central driving element 16 in such fashion that, with their free ends, they are pivotable against the inner limiting wall 24, as can be recognized in FIG. 2.

Two each adjoining vanes of the vanes 20a to j form, with the limiting wall 24, a conveying chamber for accepting meat paste, or also pieces of meat, in the region of the inlet 6, from above in accordance with arrow A, and for transport, with rotation of the driving element 16, to the outlet 10, where they are again discharged laterally, in accordance with arrow B. Correspondingly, inlet 6 and outlet 10 are constructed such that they open out into the chamber 15 in which is seated the rotor 14. Since the outlet 10 is disposed on the side of the housing 4, as has already been mentioned with the aid of FIG. 1, the inner limiting wall 24, which runs essentially parallel to the lateral outside wall of the housing 4, is also provided with a corresponding opening for forming the outlet 10, as can in particular be seen in FIG. 2.

Provided in the direction of rotation of the rotor 14, in accordance with arrow C in FIG. 2, between the outlet 10 and the inlet 6, is a negative-pressure connection, which joins the chamber 15, in which is seated the rotor 14, with a contrivance that is not represented in more detail, for generating a negative pressure and/or a vacuum, and past which the vanes 20a to j are moved, like at the inlet 6 and the outlet 10. The position of the negative-pressure connection is identified in FIGS. 2 and 3 by an arrow having the reference number 26.

As FIG. 2 additionally shows, provided on the inner limiting wall 24, in the direction of the rotor 14 as observed in accordance with arrow C, is an inwardly-projecting piece of curve or projection 28 that directly adjoins at the outlet 10, and produces a sudden reduction of the interval between the limiting wall 24 and the circular, central driving element 16. As can further be recognized in FIG. 2, a section 29 of the projection 28 adjoining directly the outlet 10 is constructed in the form of a section of cylinder, with the cylinder axis coinciding with the axis of rotation 19 of the rotor 14. In the direction toward the negative-pressure connection 26, the thickness of the projection 28 decreases gradually, so that the distance between the limiting wall 24 and the central driving element 16 is gradually increased. This interval then remains essentially unchanged after the negative-pressure connection 26, over the inlet 6, up to the outlet 10. Since the outlet 10 and the negative-pressure connection 26 are disposed at about an angle of 45° to 90° to one another, and the projection 28 is constructed only in the interveningly-lying section of the limiting wall 24, the limiting wall 24 runs in the rest of the section, i.e. from the negative-pressure connection 26, over the inlet 6, up to the outlet 10, over approximately 315° to 270°, essentially in cylindrically-shaped fashion, with the axis of the cylinder coinciding with the axis of rotation 19 of the rotor 14.

Figure 3:
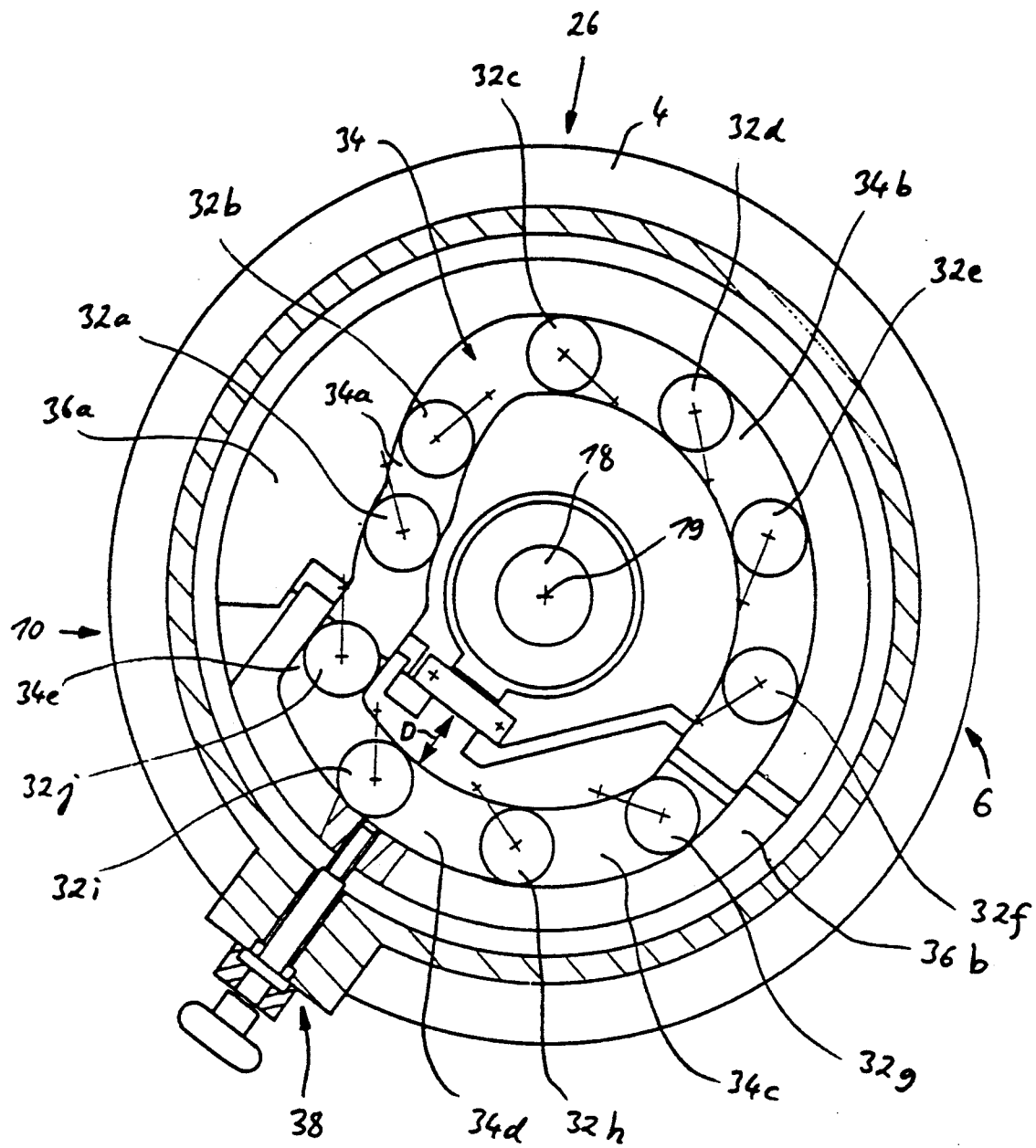
FIG. 3 shows a cross section through the vane pump, along the line III—III of FIG. 1.
Figure 4A:
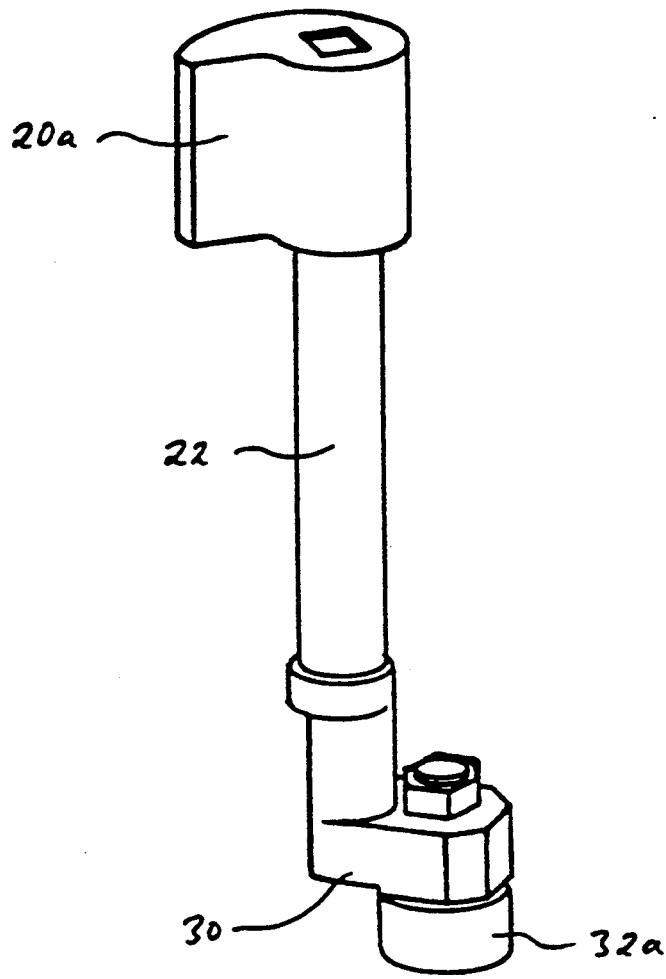
FIGS. 4a and b show an enlarged, individual representation of one vane with shaft attached thereto, and with a control arm mounted thereon.
Figure 4B:
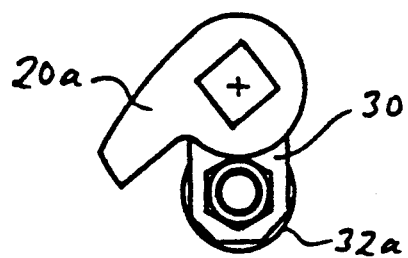

As already mentioned, the individual vanes 20a to j are each one attached to their own shaft 22. Here, the vanes 20a to j are mounted in rotation-fast fashion on the one end of the shafts 22, and actually such that they can at any time be easily removed from the chamber 15, with the cover plate removed, for the purposes of replacement, maintenance or cleaning. Attached in rotation-fast fashion at the oppositely-lying ends of the shafts 22, in each case, is a control arm 30. In this fashion, vane and control arm are rigidly attached on the shafts 22 at a predetermined angle, as can be recognized in FIG. 4. In particular, FIG. 4b permits recognizing that the vane 20a represented there and the control arm 30 are disposed at a certain angle to one another. This arrangement is the same for all vanes 20a to j. Journaled at the free end of the control arm 30 is a tread roller (32a in FIG. 4) whose axis of rotation runs parallel to the pivot axis of the shaft 22. A closed, orbital control slot 34 running about the axis of rotation 19 of the rotor 14 is constructed in a disk 36 disposed outside the chamber 15, as is represented in FIGS. 1 and 3. Guided in the control slot 34 are the tread rollers 32a to j of the control arms 30. Here, the width of the control slot 34 is slightly greater than the diameter of the tread rollers 32a to j, with the diameter in the case of all tread rollers 32a to j being constant.

During rotation of the central driving element 16, the control arms 30, in cooperation with the control slot 34, should control the pivoting movement of the individual vanes 20a to j such that the vanes 20a to j follow the contour of the limiting wall 24 and, in so doing, constantly display a certain minimum distance to the limiting wall 24, through which can be achieved, in cooperation with the contrivance for generating the negative pressure and/or vacuum, a sufficient degree of sealing without metallic contact between the vanes 20a to j and the limiting wall 24. Besides this, the control slot 34 and the control arms 30 should control the pivoting movement of the individual vanes 20a to j, with rotation of the central driving element 16, such that the volume of each conveying chamber is brought to a minimum between the individual vanes on the way from the outlet 10 to the negative-pressure connection 26, is increased considerably upon reaching the negative-pressure connection 26, remains essentially constant on the way from the negative-pressure connection 26 to the inlet 6, and after leaving the inlet 6 is again reduced somewhat on the way to the outlet 10.

In so doing, the vanes, after leaving the outlet region 10, must be pivoted toward the central driving element 16 (compare vane 20a in FIG. 2), since, because of the projection 28, the distance from the inner limiting wall 24 to the central driving element 16 is suddenly reduced. The vanes display on their forward side a contour corresponding to the cylinder-section-shaped section 29 of the projection 28, and are pivoted in the region of this sectin 29 such that with their forward sides they lie opposite to this section 29, at the minimum distance for achieving a sufficient degree of sealing, and therewith generate over the entire length of this section 29 of the projection 28 an essentially "flat" sealing gap.

When approaching the negative pressure connection 26, the vanes are swung out corresponding to the contour of the projection 28 (compare vane 20b and c in FIG. 2) in order to be able to pump the conveying chambers free of air, and remain essentially in this pivoted position until the inlet 6 is reached (compare vane 20d to f in FIG. 2). In this pivoted position, formed is the minimum interval for achieving a sufficient degree of sealing between the leading edge of the free end of the vane and the limiting wall 24, as can be recognized in FIG. 2. As soon as the vanes have left the region of the inlet 6 (compare vane 20g in FIG. 2), they are pivoted a little more forwardly in the direction of the rotor 14, in accordance with arrow C, in order to compress a little the meat paste picked up through the opening 6, and they remain in this pivoted position until reaching the outlet 10 (compare vanes 20h and i in FIG. 2).

In this pivoted position, now produced is the minimum interval between the trailing edge of the free end of the vane and the limiting wall 24. In order to enable pivoting of this type while maintaining the required minimum interval between the vanes 20a to j and the inner limiting wall 24, the free ends of the vanes 20a to j are rounded a bit and have the form of a section of a cylinder, the axis of which coincides with the pivot axis of the particular vane.

Upon reaching the outlet 10, the vane is again pivoted back toward the central driving element 16 (compare vane 20j in FIG. 2), in order to enable discharge of the meat paste through the outlet 10, to the decanting contrivance 12 and, with continuing rotation of the rotor 14, in order to be able to be picked up in the intervening space between the projection 28 and the central driving element 16.

Therefore, the control slot 34 must be laid out such that the vanes 20a to j assume at the different places the position desired there in each case, in the manner previously described based on FIG. 2. As can be recognized from FIG. 3, the control slot 34, for this purpose, displays different sections 34a, b, c, d and e, which have different intervals to the axis of rotation 19 of the rotor 14 and different patterns. The first section 34a of the control curve 34 corresponds to the path of the vane between the outlet 10 and the negative pressure connection 26. This section 34a is guided here such that, in the region of the outlet 10, the distance from the control curve 34 to the axis of rotation 19 is minimal, and upon approaching the negative-pressure connection 26 is increased. Hence, section 34a has essentially a rectilinear pattern and ends in a relatively sharp curve in the second section 34b of the control curve 34, which runs approximately quarter-circle-shaped about the axis of rotation 19 to the inlet region 6. Adjoining the second section 34b is a third section 34c, which runs somewhat over 60° arcuately about the axis of rotation 19, with an interval that is increasing. At the end of the third section 34c, the control slot 34 displays its greatest radial distance to the axis of rotation 19. The radius of the fourth section 34d adjoining the third section 34c remains essentially constant relative to the axis of rotation 19. This fourth section 34d runs somewhat one-eighth-circle-shaped and opens out in the region of the outlet 10 into a fifth section 34e, which, in a sharp bend in the direction toward the central driving element 16, adjoins and is connected with the first section 34a. In supplementation, let be noted that in FIG. 3 the positions of the inlet and of the outlet are indicated only by corresponding arrows characterized with the associated reference symbols, and that the positions of the individual, represented tread rollers 32a to j in the control slot 34 correspond to the positions of the vanes 20a to j represented in FIG. 2.

The measure of pivoting movement of the vanes 20a to j is, therefore, determined by the change of the distance of the control slot 34 from the axis of rotation 19 of the rotor 14, respectively from the central driving element 16. Here, the functioning of the control arms 30 is comparable to that of drag levers. With rotation of the central driving element 16, its movement is transferred via the shafts 22 (compare FIGS. 1 and 4) to the vanes 20a to j. Since the control arms 30 are rigidly mounted with their one end on the shafts 22 of the vanes 20a to j, their back end, guided over the tread rollers 32a to j in the control slot 34, will perforce be pulled along.

As can further be recognized in FIG. 3, the disk 36 accommodating the control slot 34 is divided into an element 36a that is stationary relative to the housing and an element 36b that is displaceable thereto in the direction of the arrow D, capable, however, of being fixed in any desired displacement position. The stationary element 36a displays the sections 34a and b of the control slot 34, while built in the displaceable element 36b are the sections 34b to e of the control slot 34. Accordingly, the control slot 34 is likewise divided into a stationary part and a part that is displaceable thereto. The stationary part of the control slot 34 therewith extends over the entire region outside of the sections 34c to e serving for precompression, while the adjustable part is disposed approximately in the region between inlet region 6 and outlet region 10. Since the measure of pivoting movement of the vanes 20a to j is determined by the change of the interval between the control slot 34 and the axis of rotation 19 of the rotor 14, it is possible, with the aid of the divided control slot 34, to change this interval in the region of compression, however, with the minimum interval between the vanes 20a to j and the limiting wall 24 needing to remain constantly guaranteed. Accordingly, in correspondence to the compressibility of the bulk substance, the pressure in the conveying chambers between the vanes 20a to j can be adapted exactly to the outlet pressure. For adjusting and locking the displaceable element 36b, provided is an appropriate adjusting mechanism 38.

The foregoingly-described embodiment of a vane pump 2 serves for conveying meat pastes such as soupy, boiled or raw sausage meat pastes. However, it is also possible to process pieces of meat or even other types of viscous bulk substances.

In the example of embodiment represented, used were ten vanes, 20a to j. The function of the described vane pump, however, is not limited to this number.

I claim:

1. A vane pump for conveying bulk substances, in particular meat paste in the form of soupy, boiled or raw sausage base, or pieces of meat or other viscous bulk substances, comprising:

a housing having an inlet and an outlet for the bulk substance;

a rotor disposed inside the housing, wherein the rotor comprises a central driving element and several moving vanes, which are arranged one behind the other on the driving element in its direction of rotation, and are commonly surrounded by a limiting wall, the limiting wall running in the direction of movement of the vanes, said vanes forming conveying chambers defined by said limiting wall for picking up and transporting the bulk substance, and with rotation of the driving element being moved past the inlet and outlet in sequence;

control means for a defined approach of the vanes toward the limiting wall up to a minimum interval, through means of which is achievable a sufficient degree of sealing without physical contact between the vanes and the limiting wall; and wherein said vanes are each one pivotably journaled about their own axis on said central driving element, and a free end of each vane facing said limiting wall has, between a leading and trailing edges, the form of a section of a cylinder allowing the pivoting of said vanes with keeping said minimum interval at least from portions of said limiting wall for adjusting the volume of said conveying chambers.

2. Vane pump according to claim 1, wherein the control means, during rotation of the central driving element, control the movement of the vanes such that the volume of each conveying chamber between the vanes, on the way from the outlet to the inlet is first brought to a minimum, and next to a maximum, and after leaving the inlet is again reduced somewhat on the way to the outlet.

3. Vane pump according to claim 2, wherein the degree of reducibility of the volume of the conveying chambers is adjustable after leaving the inlet.

4. Vane pump according to claim 2, wherein there is provided, in the direction of movement, between the outlet and the inlet, a negative-pressure connection, which is connected to a contrivance for generating the negative pressure or vacuum, and past which are moved the vanes.

5. Vane pump according to claim 4, wherein the control means, during rotation of the central driving element, control the pivoting movement of the vanes such that, after leaving the region of the outlet, they are pivoted toward the central driving element, before approaching the inlet they are swung out in the direction of rotation of the rotor, in correspondence to the contour of the limiting wall, and after leaving the inlet are pivoted somewhat further in the direction of rotation of the rotor.

6. Vane pump according to claim 5, wherein the limiting wall has the shape of a cylinder whose axis coincides with the axis of rotation of the rotor.

7. Vane pump according to claim 6, wherein the section of the cylinder of the free end of each of each vane is formed as a section of a circular cylinder having an axis which coincides with the pivot axis of the vane.

8. Vane pump according to claim 7, wherein said minimum interval for achieving a sufficient degree of sealing is provided between said leading edge of the free end of the vane and said limiting wall, and the vane, on the way to said outlet, is pivoted in the direction of rotation of said rotor far enough so that the minimum interval is then produced between said trailing edge of the free end of the vane and said limiting wall.

9. Vane pump according to claim 4, wherein the volume of the conveying chambers remains constant on the way from the negative-pressure connection to the inlet.

10. Vane pump according to claim 9, wherein the limiting wall displays a projection, which, observed in the direction of rotation of the rotor, produces, back of the outlet a sudden reduction of the interval between the limiting wall and the central driving element, and toward the inlet region a gradual widening of this interval, which then remains unchanged up to the outlet.

11. Vane pump according to claim 10, wherein the pivot axes of the vanes and the axis of rotation of the central driving element run parallel to each other.

12. Vane pump according to claim 11, wherein for all vanes the interval between the pivot axis and the axis of rotation is the same.

13. Vane pump according to claim 6, wherein a section of the projection adjoining the outlet displays the contour of a section of a cylinder whose axis coincides with the axis of rotation of the rotor, and that the vanes display a corresponding contour on their forward side, and, in the region of the projection, are pivoted such that they lie opposite this section of the projection, at the minimum interval for achieving a sufficient degree of sealing.

14. Vane pump according to claim 13, wherein each vane is journaled over a shaft on the central driving element; and the control means includes control arms, of which the control arm is rigidly attached with its one end to the shaft of a vane, and comprising a closed, orbital control curve running about the axis of rotation of the rotor, which is formed in or on a disk-shaped element, and in which each control arm is guided with its other free end.

15. Vane pump according to claim 14, wherein the control curve displays, between outlet and inlet, first a minimum distance to the axis of rotation of the rotor, and then an increased distance, and between inlet and outlet a maximum distance.

16. Vane pump according to claim 15, wherein seated at the free end of each control arm is a roller that is guided in the control curve.

17. Vane pump according to claim 16, wherein the disk-shaped element displaying the control curve is divided into an element that is stationary relative to the housing, and into an element displaceable thereto, however capable of being fixed in any desired displacement position, which displays the section of the control curve between inlet and outlet.

18. Vane pump according to claim 17, wherein the outlet is constructed in the limiting wall.

19. Vane pump according to claim 18 wherein the vanes are removably attached to the central driving element.

20. Vane pump according to claim 19 wherein each vane is mounted in rotation-fast fashion on the associated shaft.

* * * * *